Figure 6:
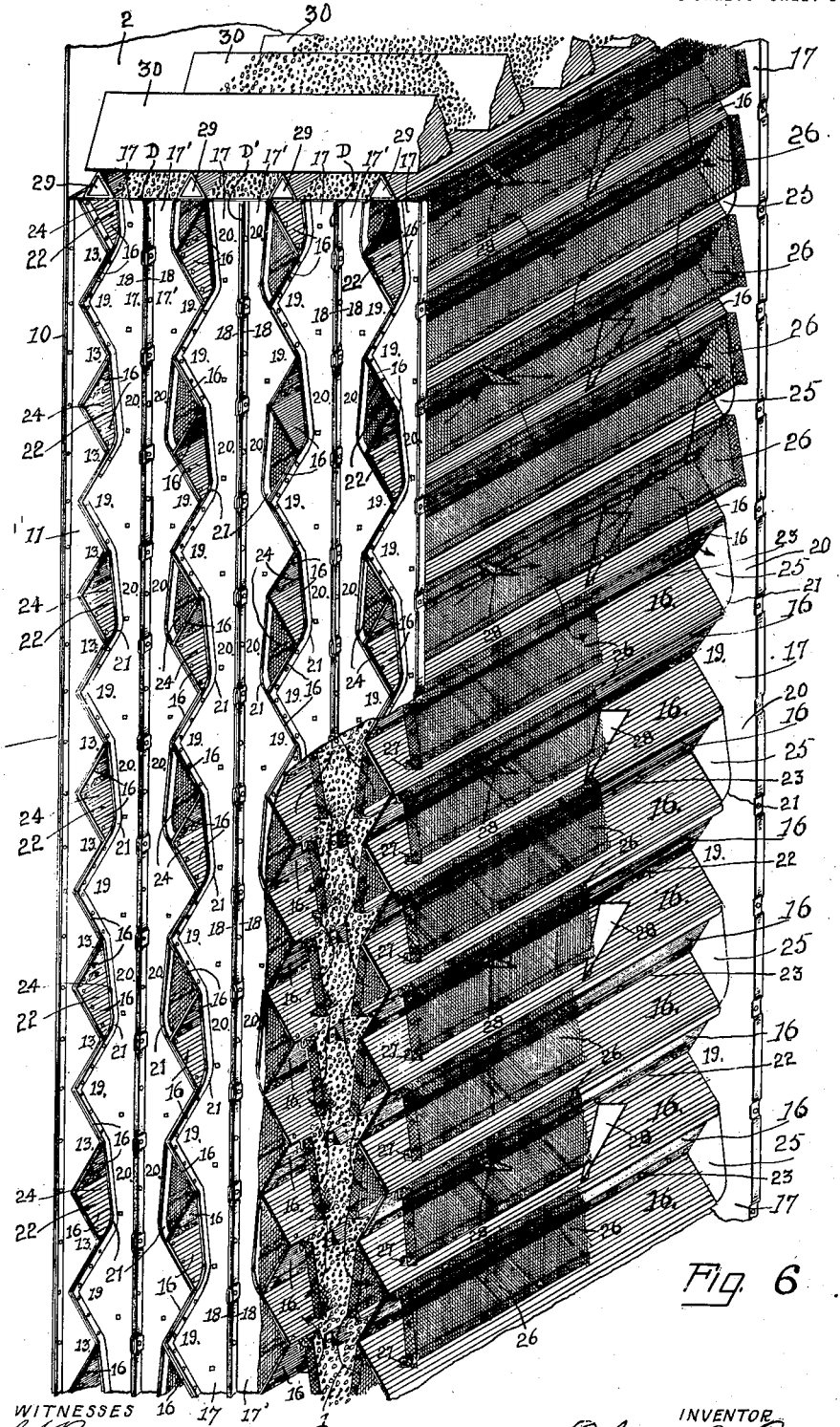

O. W. RANDOLPH.
GRAIN DRIER.
APPLICATION FILED JUNE 11, 1914.
1,196,979.
Patented Sept. 5, 1916.
6 SHEETS—SHEET 1
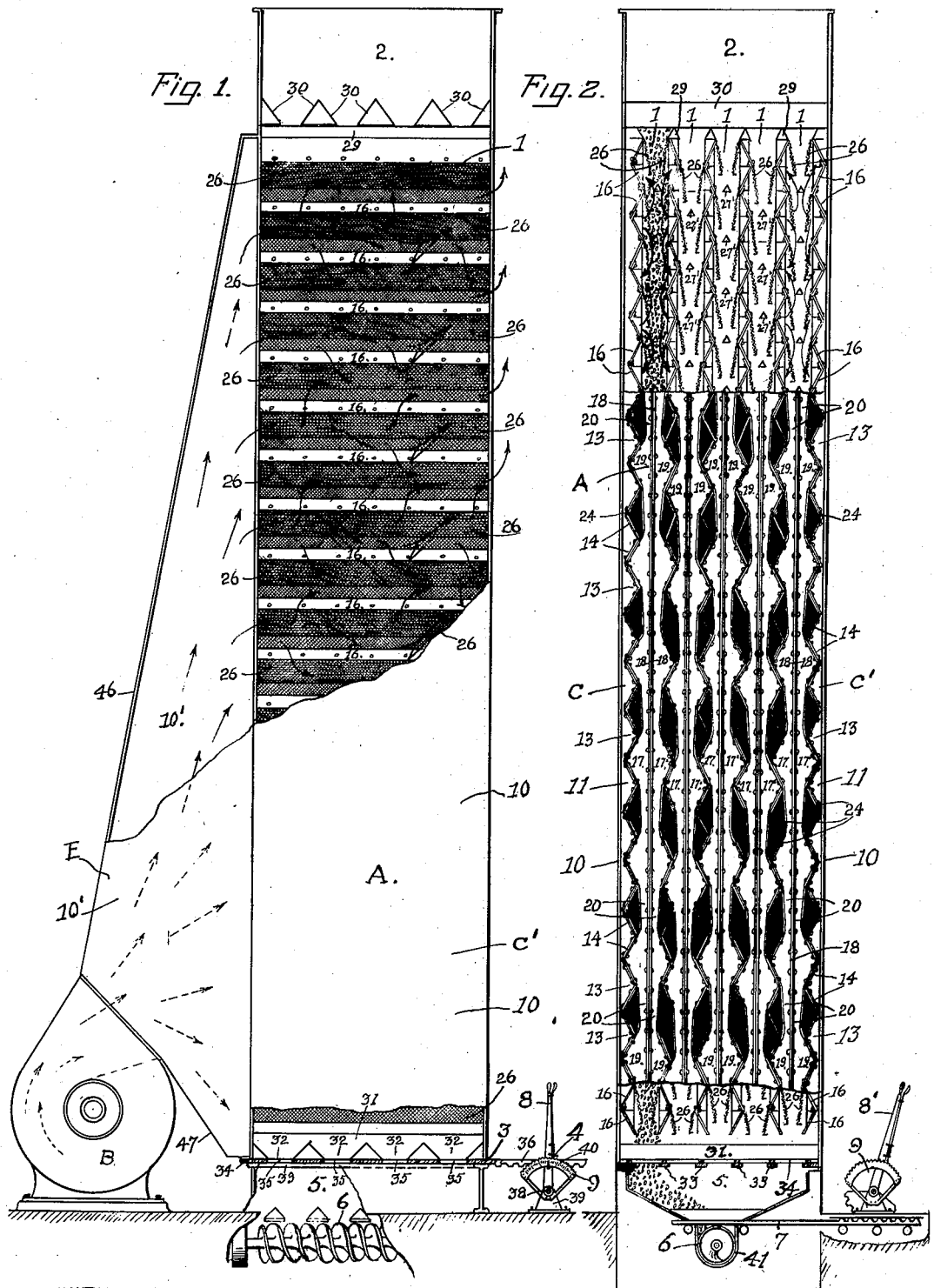

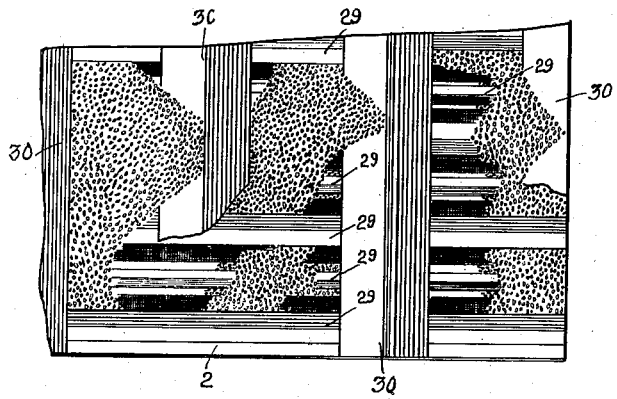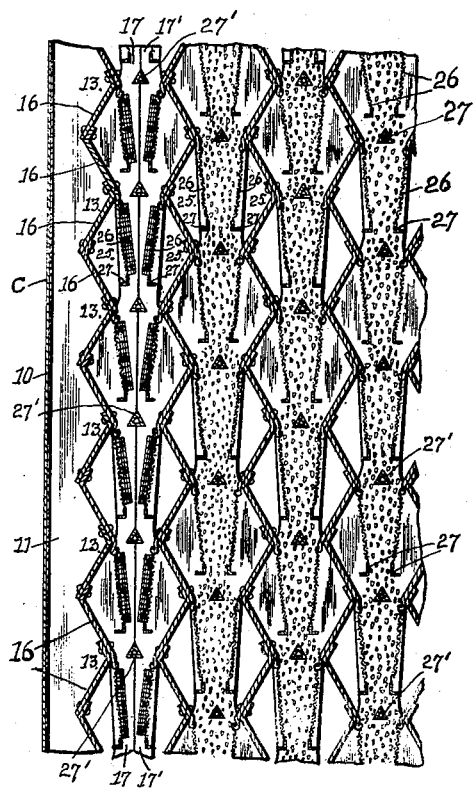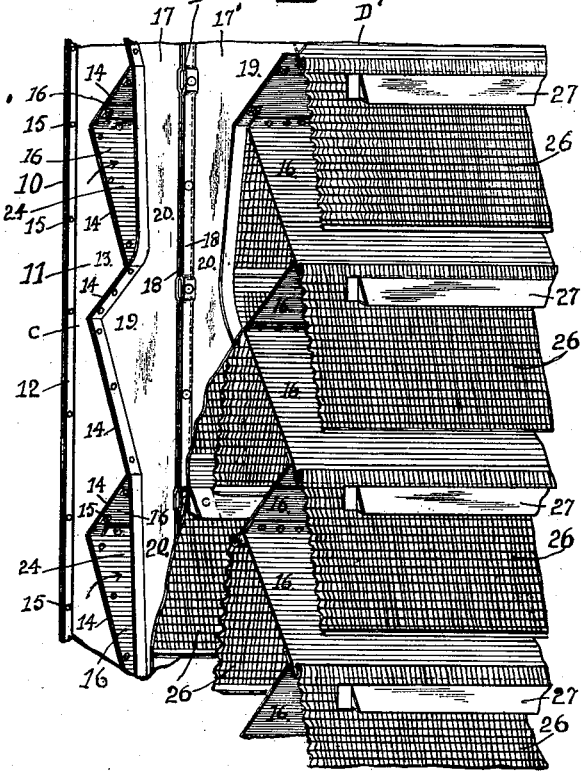

O. W. RANDOLPH.
GRAIN DRIER.
APPLICATION FILED JUNE 11, 1914.
1,196,979.
Patented Sept. 5, 1916.
6 SHEETS—SHEET 4.
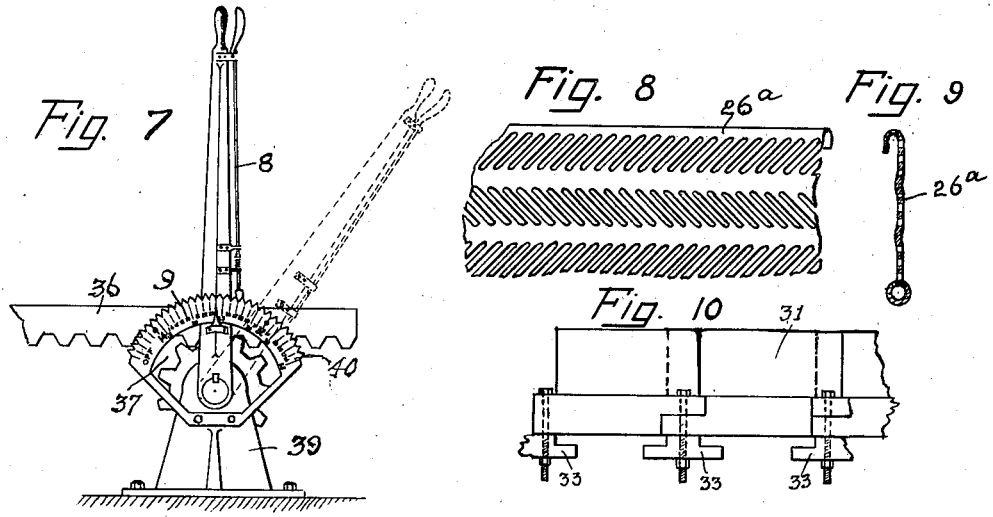
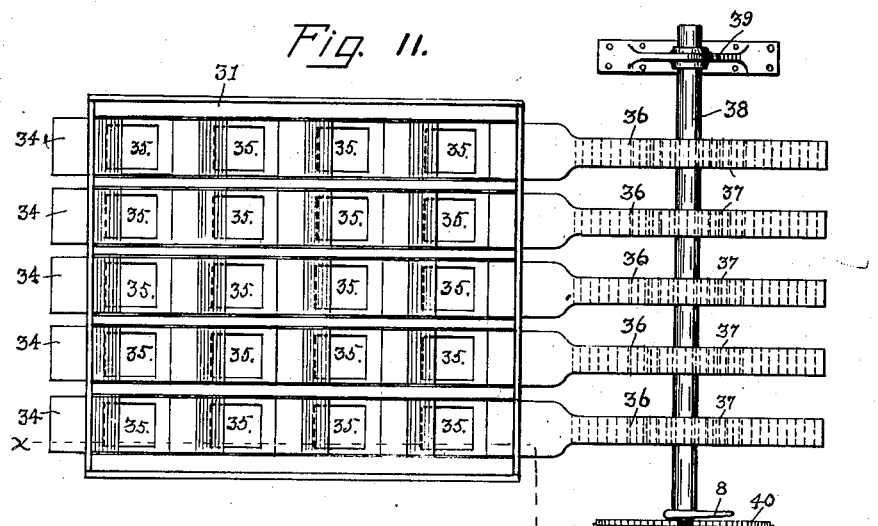
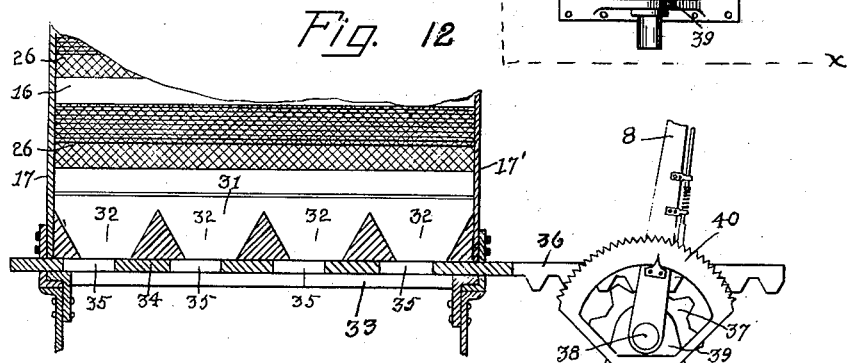

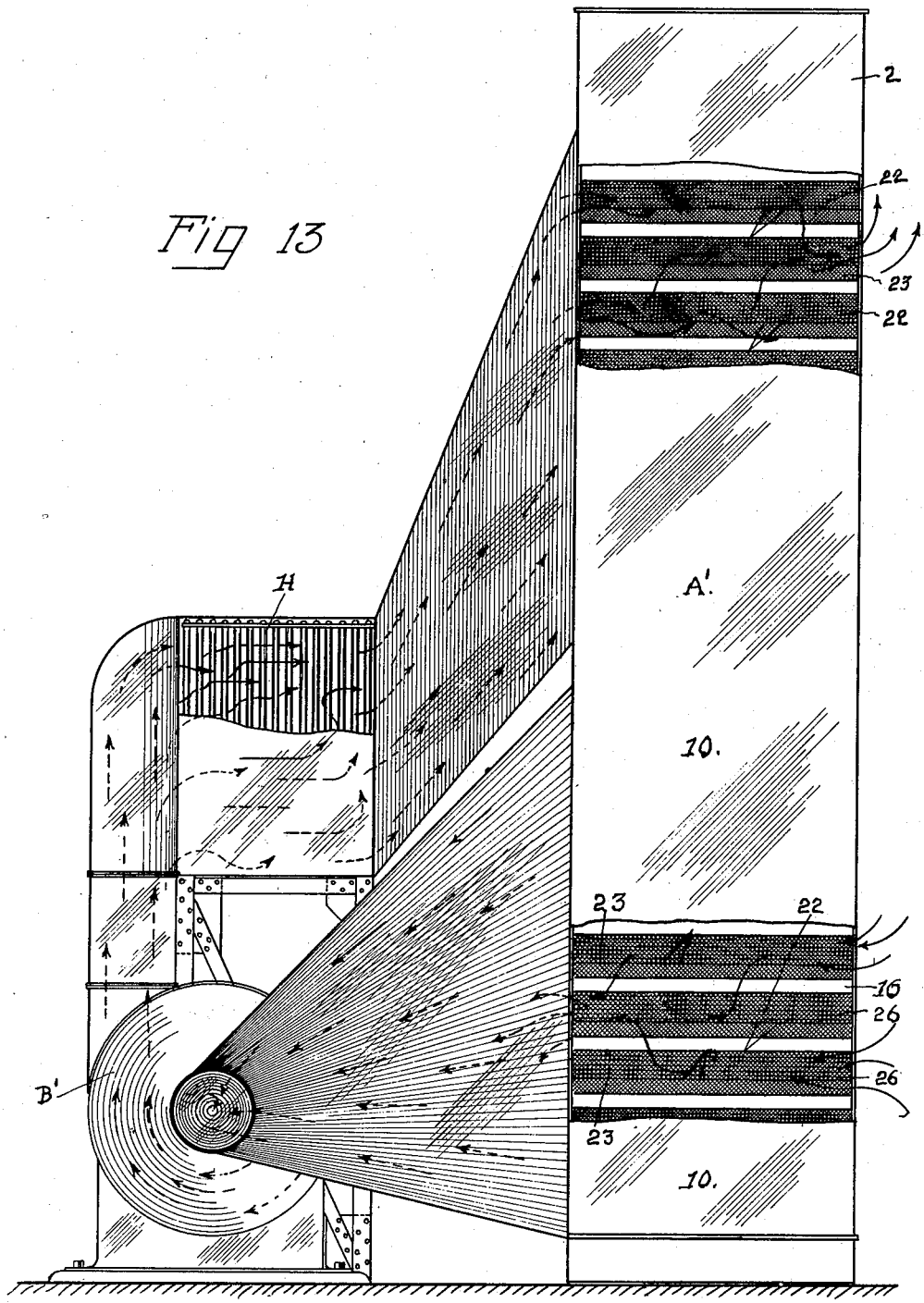

O. W. RANDOLPH.
GRAIN DRIER.
APPLICATION FILED JUNE 11, 1914.
1,196,979.
Patented Sept. 5, 1916.
6 SHEETS—SHEET 6.
Fig. 16    Fig. 15    Fig. 14
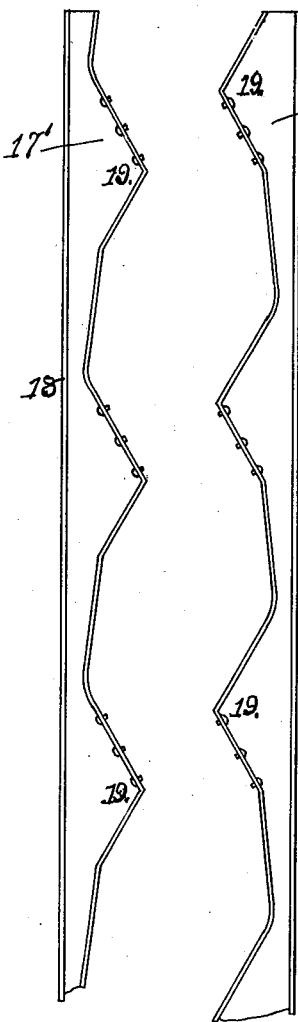
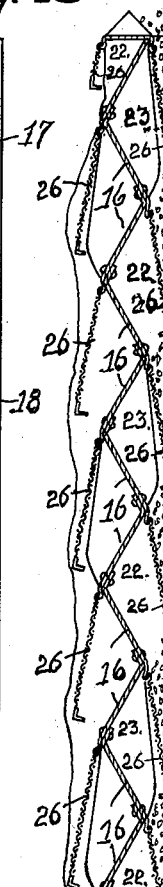
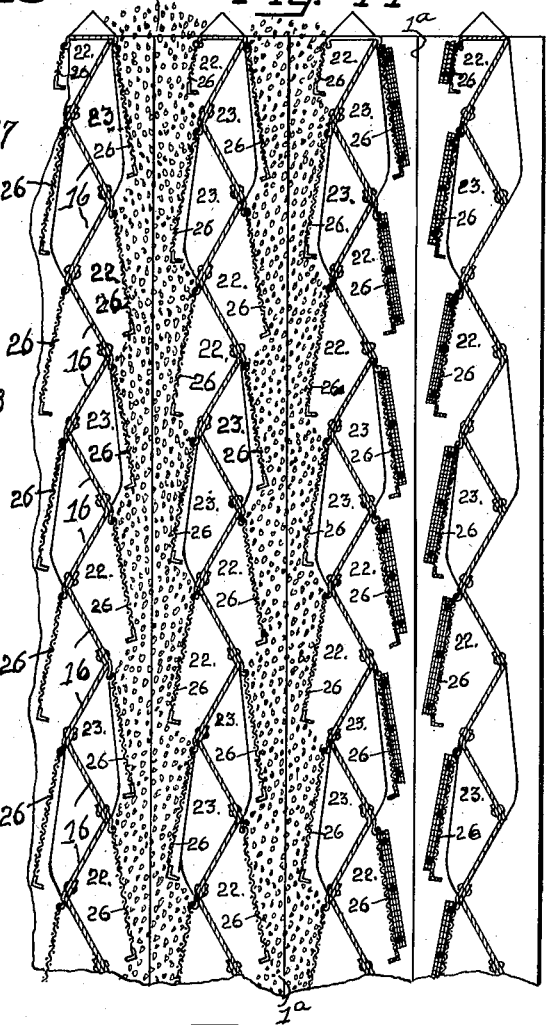
Fig. 17
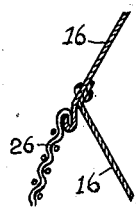
WITNESSES
INVENTOR
Oliver W. Randolph
by Robt. R. Wilson
Attorney

UNITED STATES PATENT OFFICE.

OLIVER W. RANDOLPH, OF TOLEDO, OHIO.

GRAIN-DRIER.

1,196,979.  Specification of Letters Patent.  Patented Sept. 5, 1916.

Application filed June 11, 1914. Serial No. 844,386.

*To all whom it may concern:*

Be it known that I, OLIVER W. RANDOLPH, a citizen of the United States, residing at Toledo, in the county of Lucas and State of Ohio, have invented new and useful Improvements in Grain-Driers, of which the following is a specification.

My invention relates to a grain drier and has for its object to provide an apparatus of the kind that is adapted to uniformly dry grain as it passes downward by gravity in thin columns through vertically disposed chutes, so constructed that they are adapted to permit heated air under pressure to pass laterally, uniformly and continuously through the grain in all parts of the length of each column, and thence to the outer atmosphere, whereby all absorbed moisture and a percentage of the natural moisture is eliminated from the grain in its passage from the top to the bottom of each chute.

A further object is to provide a drier of the kind wherein the form of the grain chutes are adapted to distribute the weight of the columns of grain partly to the sides of the chute, and equally to equal units of their length whereby the density of the grain is substantially uniform throughout the length of the column and the air passes as freely through the grain at the lower end portions of the chutes as at the top, and wherein the sides of the chutes are open for the free passage of air throughout their length and breadth.

A further object is to provide a drier of the kind having a plurality of grain chutes that are self cleaning and at all times free from accumulations of dust and other debris mixed with the grain.

A further object is to provide a grain drier formed of units of construction, that are adapted to be readily assembled to form any desired capacity, and that are readily separated for repair or for convenient transportation from the factory to the mill, or elevator.

A further object is to provide a grain drier that is also adapted for cooling the grain, after heating and drying it.

I accomplish these objects by the construction, arrangement and combination of parts, as hereinafter described and illustrated in the drawings, in which—

Figure 1 is a side elevation of a drier constructed in accordance with my invention, the top portion of the side casing being broken away to show the outer side of one side of a grain chute, and the inner sides of the air inducts and educts. Fig. 2 is an end view of the same with the blower and hood removed and a portion of the end plates of the chutes removed at the top portion of the drier to show interior construction of the chutes. Fig. 3 is a top view of the feed hopper of the drier. Fig. 4 is a broken away vertical section (enlarged) through the sides of the drier. Fig. 5 is an enlarged view in perspective of a broken away portion of a drier, with portions of the end plate broken away to more clearly show the interior construction. Fig. 6 is a similar view showing details not shown in Fig. 5. Fig. 7 is a side elevation of the lever controlling and regulating the bottom valves. Fig. 8 shows a broken away portion of a modified form of screen plate. Fig. 9 is a cross section of the same. Fig. 10 is a detail of the bottom directrix of the discharge controlling valves. Fig. 11 is a top plan view of the directrix and controlling valves and the mechanism for operating the valves. Fig. 12 is a cross section of the lower portion of the drier on line $x$—$x$ of Fig. 11. Fig. 13 is a side elevation of a modified form of a drier constructed in accordance with my invention, and so attached to a fan and a heater that air heated by the heater is forced by the fan through the upper half portion of the drier, and cool air is drawn by the fan by suction through the lower portion of the drier, whereby the grain is first heated to drive off the moisture and then cooled in one passage through the drier and whereby the necessity of running the grain through a separate cooler after passing through a separate drier is avoided. This combined drier and cooler is in form adapted for drying car load lots of grain at way points of rail roads instead of at terminal points of both rail and water transportation. Fig. 14 is a broken away longitudinal vertical section of a modified form of my drier, wherein the main constituent parts are arranged and combined in a slightly different relation to form the grain chutes zigzag. Figs. 15 and 16 respectively show portions of complementary end plates in said modified form of assembling, and Fig. 17 is a section of an enlarged detail of an angle formed by the duct plates, showing a preferred means of attaching the upper edges of the screens thereto.

In the drawings A comprises a drier comprising a plurality of grain chutes 1, a hopper 2, adapted to receive and direct grain into the chutes, a controlling valve 3 for each chute, controlling and equalizing the speed of grain passage through one of the chutes, a common valve controlling mechanism 4, a discharge hopper 5 to receive grain from the chutes and deliver it into a conveyer 6, and having a valve 7 controlling the rate of discharge from the hopper 5 into the conveyer 6, and quadrant levers 8 and 8' adapted to respectively operate the valves 3 and 7, and having index scales 9 indicating the degree of opening of the valves.

B indicates a blower fan adapted to draw air from a heater (not shown) and force it through the drier A as hereinafter described, and B' designates a blower adapted to draw air through the lower portion of a drier A' and force the air through a heater H and through the upper half portion of the drier A'.

The side members C and C' of the driers A and A' comprise the side plates 10, a pair of end plates 11, each having a right angled flange 12 along its outer edge and having equal triangular projections 13, formed saw tooth shape along its inner edge, produced by removing portions of such form that when the end plates are struck up in a die press to form the flanges 12 along their outer edges, the edges of the triangular projections 13 will also be provided with flanges 14. The flanges 12 are perforated to register with marginal perforations in the side plates 10, and the end plates 11 are secured to the margins of the side plates 10 by bolts 15. To the flange 14 of the projections 13 of the plates 11 of the side member C are bolted the perforated ends of the air duct plates 16 which completes the side member C. In the side member C' the air duct plates 16 are omitted.

Between the side members C are interposed a plurality of members D and D', each comprising at each end a pair of complementary end plates 17 and 17', having flanges 18 along coinciding edges by which they are connected together in pairs, one for each end, and having opposite triangular projections 19, and between the pairs of projections 19, have the downwardly converging portions 20, merging by curves 21 into the next lower pair of projections 19. The pair of projections 19 being separated by the portions 20, which are of a length equal to the distance between the points of two adjacent projections 13 of the end plates 11 of the member C.

The combined end plates 17 and 17' of a member D or D' are arranged, relatively to each other at the opposite ends of the members, to bring the projections 19 of one end plate opposite the portions 20 of the other end plate, and the two ends are connected by the air duct plates 16 which in members D are connected to the plate 17' in reverse position to their connection to the end plates of the side member C and in the member D' in parallel position with the duct plates of the member C, whereby the duct plates 16 of each member is in reverse position to duct plates of the next adjacent member.

The duct plates 16 have the top marginal portions angled to engage the underside of the lower marginal portion of the next higher plate, to which it is secured by bolts or rivets 16' (as shown in Figs. 4, 5 and 17).

The duct plates 16 of the members D and D' at one end are secured to the marginal flanges of the projections 19 of the adjacent end plates 17' and at the opposite end are supported by the next higher plates 16 to which they are marginally secured, and which are secured to the projections 19 of the opposite end plate 17'.

When the members D and D' are alternately assembled the upper flanges of the projections 19 of the members D' are secured to the lower flanges of the projections 19 of the members D at one end, and vice versa to the upper flanges at the opposite end, and when the side members C and C' are assembled respectively with the first and last members D and coupled thereto by the marginal flanges of the projections 19 by the bolts 15, the duct plates 16 of each member D and D' form with the plates 16 of the next adjacent members transverse air inducts 22 which are open at one end and closed at the other, and air educts 23 one above and one below each induct 22 and connected therewith throughout its length, said educts being closed at the end adjacent to the opening 24 of each induct and having openings 25 adjacent to the closed ends of the inducts, whereby air forced into the inducts 22 through the openings 24 passes out through the openings 25 of the educts 23.

To the lower margins of the upper faces of each pair of converging plates 16 are secured the upper marginal portions of a pair of converging and downwardly projecting screens 26, which extend to near above the next lower pair of converging plates 16 in front of the educts 23 and the inducts 22, and at their lower edges are secured to angle bars 27 which at their ends are secured to the end plates 17 and 17' at the opposite ends of the members D and D' respectively and support the screens in their converging position.

In Figs. 8 and 9 are shown a modified form of screen plate 26ª formed of sheet metal suitably perforated or slotted to allow free circulation of air therethrough without permitting the grain to pass through the plates. The plates 26ª may be substituted for the meshed wire screens 26 shown in the other figures in which the screens appear. The screen plates 26ª at their upper marginal portions are also folded hookwise for engagement with the marginal hook portions of the plates 16 and their lower marginal portions are bent cylindrical to receive the rods 27ª, which, when the screen plates 26ª are used, are substituted for the angle bars 27, the rods 27ª extending through suitable holes in the end plates 17 and 17', and through the cylindrical margins of the screens, and secured by nuts or the like in such manner as that both the rods and the screens may be readily detached and removed for the repair of the screens.

The series of pairs of screens 26, and the converging plates 16 to which they are attached, and extending from the receiving hopper 2 at the top of the drier A to the discharge hopper 5 at the bottom, constitute the grain chutes 1 wherein each pair of converging screens 26 and each pair of converging plates 16, are adapted to support the greater part of the weight of the grain opposite them in the chutes.

To further distribute the weight of the grain in the chutes, central between the lower margins of each pair of converging plates 16, in each chute 1, and centrally below each pair of converging screens 26, there is provided a triangular distributing cross bar 27, which is suitably secured by its ends jointly to the end plates 17 and 17' and in such position tend both to support the central portion of a column of grain filling the chute 1 in which they are placed, and to break up and direct the grain in the central portion of each column of grain to the right and left over against the pair of screens 26 next below each bar 27, while the plates 16 opposite each bar tend to direct the grain next the pair of screens 26 next above the bar, to the center of the column immediately below each bar 27, whereby the position of each individual kernel of the grain in the column is changed relative to the screens and the center of the column during its passage downward past each pair of converging screens 26 and converging plates 16, and it will be readily seen that air forced into the inducts 23 on one side of a column of grain will be forced through the column into the educts 24 next above and next below the inducts 23 as indicated in Figs. 2, 4 and 6 of the drawings.

In the inducts 22 the plates 16 are provided with the baffle plates 28 which are angled to retard the heated air in the inducts 22, and deflect it more uniformly throughout the length of the inducts, through the column of grain into the educts 23.

In the hopper 2 are provided next above and between the grain chutes 1, a grating formed of triangular parallel bars 29, extending between the pairs of end plates of the hopper, and between the chutes 1, and adapted to divide the grain in the hopper and direct it equally into the chutes 1, and above the bars 29, and at right angles thereto are provided the triangular distributing beams 30 adapted to equalize the feed of the grain to the top openings of the chutes 1.

Between the hopper 5 and the lower ends of the chutes 1 there is interposed a grille 31, having hopper shaped openings 32 at regular intervals below each chute 1 through which the grain passes into the hopper 5 and whereby the grain is made to travel downward through the chutes at all points between the end plates 17 and 17' of the chutes at substantially the same speed.

The bottom of the grille at intervals on each side of the openings 32 of each chute, is provided with guide ways 33, in which are slidably mounted a valve plate 34, adapted to close each opening 32 of a chute, and having openings 35 adapted to be simultaneously registered in whole or in equal part with each opening 32 of the grille opposite the respective chute. The valve plates 34 together constitute the controlling valve 3.

Each valve plate 34 has a rack extension 36 which extends over and intermeshes with a gear wheel 37 fixedly mounted on a common shaft 38, mounted and journaled at its opposite end portions in suitable bearings in pedestals 39. To one of the pedestals is attached the toothed quadrant 40 having an index scale, and on the end of the shaft 38 adjacent thereto is fixedly mounted the controlling lever 8 by which the valve plates 34 are simultaneously and equally adjusted to open the grille openings 32 to any desired degree indicated by the quadrant index. Preferably the grille 31 is formed in sections, one for each chute, as shown in Fig. 10, whereby the grille can be enlarged or decreased according to the number of chutes in the drier.

The hopper 5 has attached to its discharge a conveyer casing 41, in which is rotatably mounted an auger conveyer 42, which is connected to means to operate it (not shown), and between the conveyer and the hopper is interposed a valve plate 7 adapted to open and close the bottom of the hopper 5 to regulate the delivery of the grain from the hopper to the conveyer. The valve 7 is also controlled by a lever 8' and is set to any degree of valve opening by engaging it to the quadrant 45 adapted to indicate the degree of opening of the valve plate 7.

The fan B is connected to the drier A by a hood E, the sides of which are extensions 10' of sides 10 of the side member C, plate 46 inclined from the exit of the fan casing to the top of the drier opposite the openings to the inducts, and a bottom plate 47 inclined from the exit of the fan casing to end plates of the drier below the lowest induct openings as shown in Fig. 1.

Thus constructed the operation of the drier is as follows: The openings 32 of the grille 31 being fully closed by the valve plates 34, grain is admitted to the hopper 2 until the chutes 1 are filled. The fan is then started and heated air is forced through inducts 22 through the openings 24 and thence through the grain columns and through the educts 23 to the discharge openings 25 until the moisture is substantially driven from the grain in the chutes. The valves 34 are then operated to open the openings 32 of the grille to a degree that establishes a desired rate of flow of grain through the chutes, and the valve plate 7 being adjusted to regulate the flow of grain from the hopper 5 to the conveyer, and the conveyer 42 being adjusted to a speed adapted to the rate of flow through the chutes 1, the grain will be thereafter continuously and uniformly dried in its passage through the drier.

In the combined drier and cooler A' the construction is in all respects the same as in drier A, excepting that in the lower half portion of the drier A' the air ducts corresponding to the educts of the upper half portion become the educts of the lower half portion, through which cool air is drawn by the fan B' and forced through the heater H and thence through the inducts, grain columns and educts of the upper half portion of the drier. The baffle plates in the inducts of the lower half portion are in reverse position to those of the upper half portion, in the educts 23.

In the modified form of assemblage and combination of the parts composing the drier shown in Figs. 14, 15 and 16 the duct plates 16 forming the sides of each chute 1ª, and the partitions and common sides of the next adjacent chutes, each opposite pair of plates 16 are parallel, and each inner angle formed by the plates is opposite an outer angle instead of each outer angle being opposite an outer angle and each inner angle opposite an inner angle, as in the form of assembling shown in Figs. 1, 2, 4, 5 and 6. By this arrangement of the parts when the screens 26 are attached to the inner angles of the plates 16 of each chute 1ª they provide a zigzag course for the grain in the chute, in which each screen largely supports the weight of the column opposite the next screen above, and the zigzag course of the grain results in a continual shifting of the grain, whereby the position of the individual grains are constantly changing from the inner to outer and from the outer to the inner position in the column, and whereby more uniform contact with the heated air is attained. In this form of assembling of the parts the triangular bars 27 are omitted, but otherwise the parts are the same in construction as in the drier illustrated in Figs. 1, 2, 4, 5 and 6.

In each form the end plates 17 and 17' are made of greater length than is required between the hoppers 2 and 5, in order that the plates may be adjusted to bring the inlet and outlet openings of the ducts into the proper relation to the form of chutes adopted for the drier, by cutting off the upper ends of the plates at points suited to the position they are to occupy in the structure, and necessary to match up with the end plates that have been established in the structure in building it up.

By the construction shown and described I secure great economy of space and material with increased capacity, and the capacity of a drier may be readily increased by temporarily detaching either or both end members C, and adding members D or D' according as the structure requires and a corresponding number of sections of the grille and valve plates therefor.

By providing air inducts and educts of the forms described, and extending the screens between them, I not only secure exposure of the grain to the heated air the entire lengths of the grain columns, but I also secure, by reason of the converging position of the screens, an increased area of surface of the grain columns exposed to the heated air, and the inner angles of the sides of the chutes, together with the distributing bars 27, are adapted to constantly change the grain constituting the surface area of the columns to the interior of the columns and from the interior to the surface, whereby I secure the greatest possible uniformity in the drying of all the grain constituting the columns.

As constructed also the parts are readily dis-assembled, as necessary for replacing worn screens, and dis-assembled the parts are more conveniently and economically shipped from the factory to the mill or grain elevator where the driers are to be set up and used.

While the separable unit construction shown and described is preferred, it is manifest that the principle of construction of the grain chutes and air inducts and educts shown and described if embodied in other form of main structure would be equally effective, and I therefore do not limit myself to said separable unit construction.

What I claim to be new is—

1. In a grain drier or cooler, a grain chute comprising a pair of opposite sides, angled zigzag at equal angles from the vertical and at equal intervals of their lengths, a screen secured to each side between the sides at each inner angle, and extending downward and inward at an angle from the vertical, toward the opposite side, said screens, together with the inner angles of the sides forming a passage for grain, and end plates connecting the sides and together therewith inclosing the grain passage between the screens and the inner angles of the sides, each end plate having air openings between the screens and alternate outer angles of the sides, and forming end closures of the ends of the other outer angles, and the openings of one end plate being opposite the outer angles of the sides closed by the opposite end plate.

2. In a grain drier, a grain chute comprising equal sides angled oppositely at equal intervals of their lengths and at equal angles, the sides being relatively arranged with outer angles opposite outer angles and inner angles opposite inner angles, end plates secured to the side plates, each having openings between the screens and alternate outer angles of the side plates, and the openings of one end plate being opposite the closed outer angles of the opposite end plate, and a pair of inwardly converging screen plates projecting from each opposite pair of inner angles of the sides between the next lower outer angles.

3. In a grain drier, a grain chute comprising sides each formed of a series of duct plates connected at their side margins at equal angles, said sides being arranged with the outer angles of one side opposite outer angles of the other side, and the inner angles opposite the inner angles, end plates secured to the ends of the duct plates of the sides and forming connections between the sides, said end plates each having openings opposite alternate outer angles formed by the duct plates, and the openings of one end plate being opposite the outer angles closed by the opposite end plate, and a pair of downwardly converging screen plates secured to the upper plates forming the inner angles of the sides and each pair of screens projecting downward therefrom opposite and between the next lower outer angles of the sides.

4. In a grain drier, a grain chute comprising sides formed of a series of duct plates connected at their side margins at equal angles, said sides being arranged with the outer angles of one side opposite outer angles of the other side, and the inner angles opposite the inner angles, end plates secured to the ends of the duct plates of the sides and forming connections between the sides, said end plates each having openings opposite alternate outer angles formed by the duct plates, and the openings of one end plate being opposite the outer angles closed by the opposite end plate, a pair of downwardly converging screen plates secured to the upper plates forming the inner angles of the sides, and each pair of screens projecting downward therefrom opposite and between the next lower outer angles of the sides, and means to supply grain to the upper end of the chute, a valve closure at the lower end of the chute, adapted to regulate the flow of grain therefrom, and means to force heated air into the openings in one end plate of the chute.

5. In a grain drier, a grain chute comprising sides formed of a series of duct plates connected at their side margins at equal angles, said sides being arranged with the outer angles of one side opposite outer angles of the other side, and the inner angles opposite the inner angles, end plates secured to the ends of the duct plates of the sides and forming connections between the sides, said end plates each having openings opposite alternate outer angles formed by the duct plates, and the openings of one end plate being opposite the outer angles closed by the opposite end plate, a pair of downwardly converging screen plates secured to the upper plates forming the inner angles of the sides, and each pair of screens projecting downward therefrom opposite and between the next lower outer angles of the sides, means to supply grain to the upper end of the chute, a valve closure at the lower end of the chute, adapted to regulate the flow of grain therefrom, means to force heated air into the openings in one end plate of the chute, and baffle plates secured to the plates opposite the air inlet openings.

6. In a grain drier, a grain chute comprising equal sides angled oppositely at equal intervals of their lengths and at equal angles, the sides being relatively arranged with outer angles opposite outer angles and inner angles opposite inner angles, end plates secured to the side plates, each having openings between the screens and alternate outer angles of the side plates, and the openings of one end plate being opposite the closed outer angles of the opposite end plate, a pair of inwardly converging screen plates projecting from the inner angles of the sides between the next lower outer angles, and triangular bars extending from end plates to end plates between the inner angles of the sides.

7. In a grain drier, the combination of a series of chutes formed of a series of sides angled zigzag at equal intervals of their lengths and at equal angles, each of the chutes having one or both sides common to the next adjacent chute or chutes, a series of end plates having flanged side margins adapted to be connected together and to the ends of the sides by their side margins, and having air openings opposite each alternate outer angle of each side of each chute, the openings of one end plate of each chute alternating with openings of the opposite end plate, and screen plates connected to the inner angle of each chute and converging downward between the next lower outer angles.

8. In a grain drier, the combination of a series of chutes formed of a series of sides angled zigzag at equal intervals of their length and at equal angles, each of the chutes having one or both sides common to the next adjacent chute or chutes, each chute having the inner angles of one side opposite the inner angles of the opposite side, and the inner angles of each common side being outer angles, and the outer angles the inner angles of the next adjacent chute, a series of end plates having flanged side margins adapted to be connected together and to the ends of the sides by their side margins, and having air openings opposite each alternate outer angle of each side of each chute, the openings of one end plate of each chute alternating with the openings of the opposite end plate, screen plates connected to the inner angles of each chute and converging downward between the next lower outer angles, and a triangular deflector bar connecting the end plates central between each opposite pair of inner angles of the sides of the chutes.

9. In a grain drier, the combination with a series of chutes, each comprising sides formed of a series of equal duct plates connected zigzag by their side margins at equal angles, a pair of complementary end plates for each chute adapted to be connected to the end margins of the duct plates of the sides, and form openings opposite alternate outer angles formed by ends of the duct plate and close the space between the inner angles formed by the duct plates and the other outer angle, the openings of one end plate alternating with the openings of the opposite end plate, and a series of screen plates for each chute, connected by their upper margins to each inner angle of the sides and extending downward and inward at an angle from the vertical.

10. In a grain drier, the combination of a series of chute sides, each formed of equal duct plates having their upper margins angled equal and secured to the lower marginal portion of the next higher plate, and their lower marginal portions folded to form a hook, a screen plate for each duct plate, having its upper marginal portion folded hookwise and engaged with the marginal hook of the duct plate, and end plates connecting the sides and together with the sides forming a series of chutes each comprising a series of converging screens of the sides and air ducts between the screens and the sides.

11. In a grain drier, the combination of a series of grain chutes detachably connected together, and a series of controlling and discharging valves, one for each chute at its lower end, each said valve separately attachable and detachable, and a common means adapted to be connected to each valve of the series and operate them simultaneously and equally.

12. In a grain drier, the combination of a plurality of chute sides, each formed of equal duct plates having their upper margins angled equal and secured to the lower marginal portion of the next higher plate, and their lower marginal portions folded hookwise, a screen plate for each duct plate, having its upper marginal portion folded hookwise and engaged with the marginal hook of the duct plate, and its lower marginal portion formed cylindrical, end plates connecting the sides and together with the sides forming a series of chutes each comprising a series of converging screens of the sides and air ducts between the screens and the sides, and a series of rods, one for each screen, detachably extending through the end plates and the cylindrical marginal portions of the screens.

13. In a grain drier or cooler a grain chute comprising a pair of opposite sides angled zigzag at equal intervals of their length, a plurality of division plates, one secured by its upper marginal portion to each side at the inner angles of each side and extending downward and inward toward the opposite side at an angle from the vertical opposite the next lower outer angle of the sides, and having its lower edge near to the next lower inner angle and forming an opening between the lower edge of the division plate and the top portion of the next lower division plate of the same side, said division plates together forming a restricting passage for grain between the division plates and air spaces between the outer angles of the sides and the division plates, with openings therefrom into the grain passages adapted to admit air into and out of the grain passage without admitting grain into the air spaces, and members connected to the edges of the sides and the ends of the division plates and forming closures for the grain passage and closures for the ends of alternate air spaces, whereby alternate air spaces are open at one end and closed at the other.

In witness whereof I have hereunto set my hand at Toledo, Ohio, this 4th day of June, 1914, in the presence of two subscribing witnesses.

OLIVER W. RANDOLPH.

In presence of—
K. D. KEILHOLTZ,
CHAS. W. MOLLETT.